12) United States Patent
Walther et al.

(10) Patent No.: US 11,981,758 B2
(45) Date of Patent: May 14, 2024

(54) PROCESS TO FORM A COMPOSITION CONTAINING FUNCTIONALIZED AND UN-FUNCTIONALIZED ETHYLENE-BASED POLYMERS (71) Applicant: Dow Global Technologies LLC, Midland, MI (US)

(72) Inventors: Brian W. Walther, Lake Jackson, TX (US); Santosh S. Bawiskar, Sugar Land, TX (US); Jianping Pan, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 382 days.

(21) Appl. No.: 16/465,927

(22) PCT Filed: Nov. 11, 2017

(86) PCT No.: PCT/US2017/062161
§ 371 (c)(1),
(2) Date: May 31, 2019

(87) PCT Pub. No.: WO2018/102148
PCT Pub. Date: Jun. 7, 2018

(65) Prior Publication Data
US 2020/0079883 A1    Mar. 12, 2020

(30) Foreign Application Priority Data
Dec. 2, 2016   (WO) ............... PCT/CN2016/108309

(51) Int. Cl.
*C08L 23/16*    (2006.01)
*C08F 2/01*     (2006.01)
(Continued)

(52) U.S. Cl.
CPC ............ *C08F 2/04* (2013.01); *C08F 2/01* (2013.01); *C08F 210/16* (2013.01); *C08J 3/005* (2013.01);
(Continued)

(58) Field of Classification Search
CPC .......... C08L 23/16; C08L 23/26; C08L 51/06; C08L 2205/02; C08L 2201/10; C08L 2203/16; C08F 2/01
See application file for complete search history.

(56) References Cited

U.S. PATENT DOCUMENTS 5,663,326 A  *  9/1997  Wolleb ............... C07D 487/22
                                                            540/122
7,064,163 B2 *  6/2006  Shida ................. C09J 123/0815
                                                            525/70
(Continued)

FOREIGN PATENT DOCUMENTS

WO        2004022661 A2     3/2004
WO    WO 2013/184187 A1 * 12/2013    ............. B32B 27/36
(Continued)

OTHER PUBLICATIONS

PCT/CN2016/108309, International Search Report and Written Opinion dated Sep. 12, 2017.
(Continued)

*Primary Examiner* — Rip A Lee (57) ABSTRACT

A process to form a polymer composition comprising an ethylene-based polymer and a functionalized ethylene-based polymer, said process comprising the steps described herein, which include passing a polymer melt through at least one static mixer, and wherein the functionalized ethylene-based polymer, in melt form, is introduced into the polymer melt, before the polymer melt enters the static mixer.

7 Claims, 1 Drawing Sheet

(51) Int. Cl.
*C08F 2/04* (2006.01)
*C08F 210/16* (2006.01)
*C08J 3/00* (2006.01)
*C08L 23/26* (2006.01)
*C08L 51/06* (2006.01)
*C08F 6/10* (2006.01)
*C08F 6/26* (2006.01)

(52) U.S. Cl.
CPC ............... *C08L 23/16* (2013.01); *C08F 6/10* (2013.01); *C08F 6/26* (2013.01); *C08J 2323/08* (2013.01); *C08J 2451/06* (2013.01); *C08L 23/26* (2013.01); *C08L 51/06* (2013.01); *C08L 2203/16* (2013.01); *C08L 2205/02* (2013.01)

(56) References Cited

U.S. PATENT DOCUMENTS

| | | | | |
|---|---|---|---|---|
| 7,803,876 B2* | 9/2010 | Yeh | ................ | B29B 7/002 525/198 |
| 7,994,237 B2* | 8/2011 | Kiss | ................ | C08L 23/04 523/348 |
| 8,138,269 B2* | 3/2012 | Kiss | ................ | C08L 23/10 525/240 |
| 8,143,352 B2* | 3/2012 | Kiss | ................ | C08F 10/06 525/240 |
| 8,673,451 B2* | 3/2014 | Botros | ................ | B32B 7/12 428/521 |
| 8,852,738 B2* | 10/2014 | Albert | ................ | C09J 133/02 428/347 |
| 8,876,365 B2 | 11/2014 | Pollard et al. | | |
| 10,502,913 B2* | 12/2019 | Harris | ................ | G02B 6/443 |
| 10,597,472 B2* | 3/2020 | Sleijster | ................ | C08F 210/02 |
| 10,730,987 B2* | 8/2020 | Demirors | ................ | C08K 5/01 |
| 10,829,610 B2* | 11/2020 | Al-Haj Ali | ................ | C08F 6/003 |
| 10,870,754 B2* | 12/2020 | Habersberger | ................ | C08J 5/12 |
| 2007/0208110 A1 | 9/2007 | Sigworth et al. | | |
| 2009/0043045 A1* | 2/2009 | Resconi | ................ | C08L 23/10 525/240 |
| 2009/0234083 A1* | 9/2009 | Bigiavi | ................ | C08F 10/00 526/71 |
| 2014/0079897 A1 | 3/2014 | Cheung et al. | | |
| 2015/0247014 A1 | 9/2015 | Oner-Deliormanli et al. | | |
| 2015/0376385 A1 | 12/2015 | Subramanian | | |
| 2016/0304650 A1 | 10/2016 | Read et al. | | |
| 2017/0129976 A1 | 5/2017 | Kolthammer et al. | | |
| 2017/0313800 A1 | 11/2017 | Karjala et al. | | |
| 2018/0002572 A1 | 1/2018 | Nieto et al. | | |
| 2018/0258209 A1 | 9/2018 | Dhodapkar et al. | | |
| 2019/0077129 A1* | 3/2019 | Botros | ................ | B32B 27/34 |

FOREIGN PATENT DOCUMENTS

WO 2017/116843 A1 7/2017
WO 2018/071507 A1 4/2018

OTHER PUBLICATIONS

PCT/CN2016/108309, International Preliminary Report on Patentability dated Jun. 4, 2019.
PCT/US2017/062161, International Search Report and Written Opinion dated Feb. 9, 2018.
PCT/US2017/062161, International Preliminary Report on Patentability dated Jun. 4, 2019.
Thakur et al., Static Mixers in the Process Industries—A Review, IChemE, vol. 81, Part A, Aug. 2003.

* cited by examiner

PROCESS TO FORM A COMPOSITION CONTAINING FUNCTIONALIZED AND UN-FUNCTIONALIZED ETHYLENE-BASED POLYMERS

REFERENCE TO RELATED APPLICATIONS

This application claims priority to International Application No. PCT/CN16/108309, filed on Dec. 2, 2016.

BACKGROUND

Grafted ethylene-based polymers, particularly ethylene-based copolymers grafted with maleic anhydride (MAH), are useful in adhesive formulations, in tie layers for multilayer structures, as coupling agents for highly filled or halogen-free flame retardant (HFFR) formulations, and as compatibilizers in polymer blends. The grafted (e.g., MAH) functionality helps chemical interaction of the ethylene-based polymers to polar polymers like nylon, ethylene vinyl alcohol (EVOH), and inorganic fillers. The grafted functionality also increases the surface polarity of the ethylene-based polymers, to improve adhesion to paints, and printing inks. Unfortunately, the methods used to make highly grafted ethylene-based polymers tend to have inherent process inefficiencies, resulting in low production rates, and typically produce grafted polymers with high gel levels. Compositions containing functionalized polymers, and processes to form the same, are described in the following references: WO2004/022661 (discloses blends of a grafted material with a non-grafted material being produced on a gas phase train, using a twin screw is used for blending) and, U.S. Publication No. 2007/0208110 (non-extrusion process for functionalization of low viscosity polymers), and International Application No. PCT/US16/05307 (filed Sep. 22, 2016). See also U.S. Pat. No. 8,876,365, WO2015/191066, and U.S. Application No. 62/272,390 (filed Dec. 29, 2015).

There is a need for an efficient process to form a polymer composition containing an ethylene-based polymer and a functionalized ethylene-base polymer, and preferably in pellet form (for example, a single pellet). The process should reduce the number re-melting steps, as compared to conventional processes. These needs have been met by the following invention.

SUMMARY OF THE INVENTION

A process is provided to form a polymer composition comprising an ethylene-based polymer and a functionalized ethylene-based polymer, said process comprising at least the following:
  a) polymerizing, in a solution polymerization, ethylene and optionally one or more comonomers, in a solvent, in a reactor configuration comprising at least one reactor, to form a polymer solution comprising the ethylene-based polymer;
  b) passing the polymer solution through at least one devolatilizer to remove the "bulk of the solvent," based on the weight of the solvent in the polymer solution, to form a polymer melt;
  c) passing the polymer melt through at least one static mixer, and wherein the functionalized ethylene-based polymer, in melt form, is introduced into the polymer melt, before the polymer melt enters the static mixer; and
  d) mixing the polymer melt and the functionalized ethylene-based polymer in the static mixer, to form the polymer composition.

DETAILED DESCRIPTION

Figure 2:
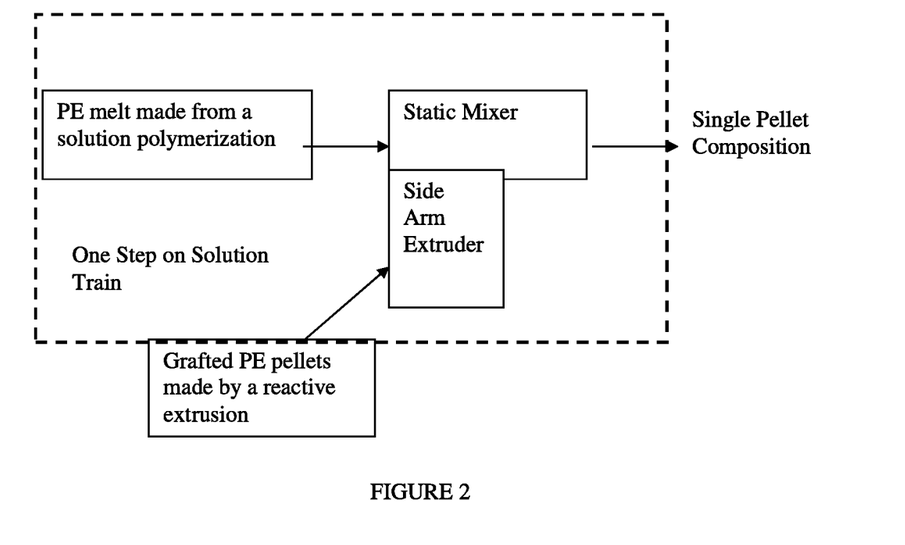
FIG. 2 depicts an inventive process to a make single pellet composition (2 step process).

A manufacturing process has been discovered to produce a polymer composition, preferably in pellet form, and containing an ethylene-based polymer, a functionalized ethylene-based polymer and optionally additives. It has been discovered that this polymer composition that has adhesive characteristics, and can function as a tie layer to bond multilayer structures, comprising layers of non-polar olefin-based polymers and polar polymers, such as, for example, EVOH or nylon. It has been discovered that this polymer composition can be prepared, in-line, with a solution polymerization process, and without the need for an additional melting step, before extruding the polymer composition, in pellet form (for example, a single pellet), into a final end product, such as a film. See, for example, FIG. 2. It has also been discovered that the polymer composition has low gel levels.

As discussed above, a process is provided to form a polymer composition comprising an ethylene-based polymer and a functionalized ethylene-based polymer, said process comprising at least the following:
  a) polymerizing, in a solution polymerization, ethylene and optionally one or more comonomers, in a solvent, in a reactor configuration comprising at least one reactor, to form a polymer solution comprising the ethylene-based polymer;
  b) passing the polymer solution through at least one devolatilizer to remove the "bulk of the solvent," based on the weight of the solvent in the polymer solution, to form a polymer melt;
  c) passing the polymer melt through at least one static mixer, and wherein the functionalized ethylene-based polymer, in melt form, is introduced into the polymer melt, before the polymer melt enters the static mixer; and
  d) mixing the polymer melt and the functionalized ethylene-based polymer in the static mixer, to form the polymer composition.

The above process may comprise a combination of two or more embodiments as described herein.

In one embodiment, in step b), ≥60 wt %, or ≥70 wt %, or ≥80 wt %, or ≥90 wt %, of the solvent in the polymer solution formed after the solution polymerization process, is removed. The wt % is based on the weight of the solvent in the polymer solution. In one embodiment, after the bulk of solvent is removed in step b), <0.15 wt %, or <0.10 wt %, or <0.05 wt % residual solvent, based on the weight of the resulting polymer melt, remains in the polymer melt. "The polymer solution and polymer melt can each be examined by Head Space GC (Gas Chromatography) to determine the amount of solvent in the respective form of the polymer product."

In one embodiment, in step b), ≥90 wt %, or ≥95 wt %, or ≥98 wt %, or ≥99 wt %, of the solvent in the polymer solution formed after the solution polymerization process, is removed. The wt % is based on the weight of the solvent in the polymer solution. In one embodiment, after the bulk of solvent is removed in step b), <0.15 wt %, or <0.10 wt %, or <0.05 wt % residual solvent, based on the weight of the resulting polymer melt, remains in the polymer melt. "The polymer solution and polymer melt can each be examined by Head Space GC (Gas Chromatography) to determine the amount of solvent in the respective form of the polymer product."

The ethylene-based polymer differs from the functionalized ethylene-based polymer in one or more properties, such as the presence of one or more heteroatoms incorporated into the polymer molecules, the amount of functionalization, density, melt index I2, Mw, Mn, MWD, type of comonomer, and/or amount of comonomer.

In one embodiment, the ethylene-based polymer does not comprise a heteroatom.

In one embodiment, the ethylene-based polymer is a polyethylene homopolymer.

In one embodiment, the ethylene-based polymer is an ethylene/alpha-olefin interpolymer. Suitable $\alpha$-olefins include $C_3$-$C_{20}$ $\alpha$-olefins, and preferably $C_3$-$C_{10}$ $\alpha$-olefins.

In one embodiment, the ethylene-based polymer is an ethylene/alpha-olefin copolymer. Suitable $\alpha$-olefins include $C_3$-$C_{20}$ $\alpha$-olefins, and preferably $C_3$-$C_{10}$ $\alpha$-olefins.

In one embodiment, the functionalized ethylene-based polymer, in melt form, is introduced into the polymer melt, using a side-arm extruder. In one embodiment, the transition time required to the purge the polymer composition from the extruder is less than 60 minutes, further less than 30 minutes, further less than 20 minutes, further less than 10 minutes.

In one embodiment, the functionalized ethylene-based polymer, in melt form, is introduced into the polymer melt, using a side-arm extruder, and wherein the melt index (I2, 190° C.) of the functionalized ethylene-based polymer, in melt form, is from 0.3 to 25 dg/min, or from 0.8 to 12 dg/min, or from 1.0 to 8.0 dg/min, or from 1.5 to 5.0 dg/min.

In one embodiment, the functionalized ethylene-based polymer, in melt form, is introduced into the polymer melt, using a side-arm extruder, and wherein the melt viscosity (190° C.) of the functionalized ethylene-based polymer, in melt form, is from 900 Pa·s to 11,000 Pa·s, or from 1200 Pa·s to 10,000 Pa·s, or from 1500 Pa·s to 9,000 Pa·s, or from 2000 Pa·s to 8,000 Pa·s, or from 3000 Pa·s to 7,000 Pa·s (190° C., 1 rad/sec, ASTM D4440-15).

In one embodiment, the functionalized ethylene-based polymer, in melt form, is introduced into the polymer melt, using a side-arm extruder, and wherein the weight ratio of this functionalized ethylene-based polymer to the ethylene-based polymer, in the combined polymer melts, is from 1/20 to 1/4, or from 1/18 to 1/5, or from 1/16 to 1/6, or from 1/14 to 1/7, or from 1/12 to 1/8, or from 1/10 to 1/8.

In one embodiment, the functionalized ethylene-based polymer, in melt form, is introduced into the polymer melt, using a side-arm extruder, and wherein the ratio of the melt index (I2, 190° C.) of the functionalized ethylene-based polymer to the melt index (I2, 190° C.) ethylene-based polymer, is from 0.20 to 5.00, or from 0.30 to 4.00, or from 0.40 to 3.00.

In one embodiment, the functionalized ethylene-based polymer, in melt form, is introduced into the polymer melt, using a side-arm extruder, and wherein the melt index (I2, 190° C.) of the functionalized ethylene-based polymer, in melt form, is from 0.3 to 25 dg/min, or from 0.8 to 12 dg/min, or from 1.0 to 8.0 dg/min, or from 1.5 to 5.0 dg/min; and the ratio of the melt index (I2, 190° C.) of the functionalized ethylene-based polymer to the melt index (I2, 190 C) ethylene-based polymer, is from 0.20 to 5.00, or from 0.30 to 4.00, or from 0.40 to 3.00. In a further embodiment, the wherein the weight ratio of this functionalized ethylene-based polymer to the ethylene-based polymer, in the combined polymer melts, is from 1/20 to 1/4, or from 1/18 to 1/5, or from 1/16 to 1/6, or from 1/14 to 1/7, or from 1/12 to 1/8, or from 1/10 to 1/8.

In one embodiment, the functionalized ethylene-based polymer, in melt form, is introduced into the polymer melt, using a side-arm extruder, and wherein the melt viscosity (190° C.) of the functionalized ethylene-based polymer, in melt form, is from 900 Pa·s to 11,000 Pa·s, or from 1200 Pa·s to 10,000 Pa·s, or from 1500 Pa·s to 9,000 Pa·s, or from 2000 Pa·s to 8,000 Pa·s, or from 3000 Pa·s to 7,000 Pa·s (190° C., 1 rad/sec, ASTM D4440-15); and the ratio of the melt index (I2, 190° C.) of the functionalized ethylene-based polymer to the melt index (I2, 190 C) ethylene-based polymer, is from 0.20 to 5.00, or from 0.30 to 4.00, or from 0.40 to 3.00. In a further embodiment, the weight ratio of this functionalized ethylene-based polymer to the ethylene-based polymer, in the combined polymer melts, is from 1/20 to 1/4, or from 1/18 to 1/5, or from 1/16 to 1/6, or from 1/14 to 1/7, or from 1/12 to 1/8, or from 1/10 to 1/8.

In one embodiment, the functionalized ethylene-based polymer, in melt form, is introduced into the polymer melt, and wherein the melt index (I2, 190° C.) of the functionalized ethylene-based polymer, in melt form, is from 0.3 to 25 dg/min, or from 0.8 to 12 dg/min, or from 1.0 to 8.0 dg/min, or from 1.5 to 5.0 dg/min.

In one embodiment, the functionalized ethylene-based polymer, in melt form, is introduced into the polymer melt, and wherein the melt viscosity (190° C.) of the functionalized ethylene-based polymer, in melt form, is from 900 Pa·s to 11,000 Pa·s, or from 1200 Pa·s to 10,000 Pa·s, or from 1500 Pa·s to 9,000 Pa·s, or from 2000 Pa·s to 8,000 Pa·s, or from 3000 Pa·s to 7,000 Pa·s (190° C., 1 rad/sec, ASTM D4440-15).

In one embodiment, the functionalized ethylene-based polymer, in melt form, is introduced into the polymer melt, and wherein the weight ratio of this functionalized ethylene-based polymer to the ethylene-based polymer, in the combined polymer melts, is from 1/20 to 1/4, or from 1/18 to 1/5, or from 1/16 to 1/6, or from 1/14 to 1/7, or from 1/12 to 1/8, or from 1/10 to 1/8.

In one embodiment, the functionalized ethylene-based polymer, in melt form, is introduced into the polymer melt, and wherein the ratio of the melt index (I2, 190° C.) of the functionalized ethylene-based polymer to the melt index (I2, 190° C.) ethylene-based polymer, is from 0.20 to 5.00, or from 0.30 to 4.00, or from 0.40 to 3.00.

In one embodiment, the functionalized ethylene-based polymer, in melt form, is introduced into the polymer melt, and wherein the melt index, I2 (190° C.) of the functionalized ethylene-based polymer, in melt form, is from 0.3 to 25 dg/min, or from 0.8 to 12 dg/min, or from 1.0 to 8.0 dg/min, or from 1.5 to 5.0 dg/min; and the ratio of the melt index (I2, 190° C.) of the functionalized ethylene-based polymer to the melt index (I2, 190 C) ethylene-based polymer, is from 0.20 to 5.00, or from 0.30 to 4.00, or from 0.40 to 3.00. In a further embodiment, the weight ratio of the functionalized ethylene-based polymer to the ethylene-based polymer, in the combined polymer melts, is from 1/20 to 1/4, or from 1/18 to 1/5, or from 1/16 to 1/6, or from 1/14 to 1/7, or from 1/12 to 1/8, or from 1/10 to 1/8.

In one embodiment, the functionalized ethylene-based polymer, in melt form, is introduced into the polymer melt, and wherein the melt viscosity (190° C.) of the functionalized ethylene-based polymer, in melt form, is from 900 Pa·s to 11,000 Pa·s, or from 1200 Pa·s to 10,000 Pa·s, or from 1500 Pa·s to 9,000 Pa·s, or from 2000 Pa·s to 8,000 Pa·s, or from 3000 Pa·s to 7,000 Pa·s (190 C, 1 rad/sec, ASTM D4440-15); and the ratio of the melt index (I2, 190° C.) of the functionalized ethylene-based polymer to the melt index (I2, 190° C.) ethylene-based polymer, is from 0.20 to 5.00, or from 0.30 to 4.00, or from 0.40 to 3.00. In a further embodiment, the weight ratio of this functionalized ethylene-based polymer to the ethylene-based polymer, in the combined polymer melts, is from 1/20 to 1/4, or from 1/18 to 1/5, or from 1/16 to 1/6, or from 1/14 to 1/7, or from 1/12 to 1/8, or from 1/10 to 1/8.

In one embodiment, there is no melt cooler system located downstream from the static mixer. For an example of a melt cooler system, see WO2015/191066.

In one embodiment, the static mixer comprises ≥1, or ≥2, or ≥3 mixing elements, such as helical mixing elements. Static mixers are available, for example, from Chemineer (KM, KMX, HEV), Fluitec Georg AG (CES, CSE-X, CSE-XR), Komax Systems (A Series, M Series), Lightnin' Mixer (Inliner Series 45), Ross Mixers Statiflo International (ISG, LPD, STM, STX), Sulzer Chemtech (SMX, SMXL, SMV, SMF, SMR, KVM) and Pittaluga Static Mixers (XP, VP, X, XL).

In one embodiment, the process further comprises pelletizing the polymer composition. In a further embodiment, the pelletization apparatus is in-line with the static mixer, and the polymer composition is fed into the pelletization apparatus, after exiting the static mixer.

In one embodiment, the reactor is a loop reactor or a continuous stirred tank reactor. In one embodiment, the reactor is a loop reactor.

In one embodiment, the polymer composition has a gel content (GI200) of ≤20, or ≤18, or ≤16, or ≤14, or ≤12, or ≤10, or ≤8.0, or ≤7.0, or ≤6.0, or ≤5.0 mm$^2$ per 24.6 cm$^3$ of film.

In one embodiment, the functionalized ethylene-based polymer is present in an amount from 2 wt % to 50 wt %, or from 2 to 45 wt %, or from 2 wt % to 40 wt %, or from 2 wt % to 35 wt %, or from 2 wt % to 30 wt %, based on the weight of the polymer composition.

In one embodiment, the functionalized ethylene-based polymer is present in an amount from 2 wt % to 25 wt %, or from 2 to 20 wt %, or from 2 wt % to 15 wt %, or from 2 wt % to 10 wt %, or from 2 wt % to 5 wt %, based on the weight of the polymer composition.

In one embodiment, the functionalized ethylene-based polymer is present in an amount from 2 wt % to 50 wt %, or from 2 to 45 wt %, or from 2 wt % to 40 wt %, or from 2 wt % to 35 wt %, or from 2 wt % to 30 wt %, based on the weight of the ethylene-based polymer and the functionalized ethylene-based polymer.

In one embodiment, the functionalized ethylene-based polymer is present in an amount from 2 wt % to 25 wt %, or from 2 to 20 wt %, or from 2 wt % to 15 wt %, or from 2 wt % to 10 wt %, or from 2 wt % to 5 wt %, based on the weight of the ethylene-based polymer and the functionalized ethylene-based polymer.

In one embodiment, the weight ratio of functionalized ethylene-based polymer to ethylene-based polymer is from 1/20 to 1/3, or from 1/20 to 1/5, or from 1/20 to 1/7, or from 1/20 to 1/9.

In one embodiment, the weight ratio of functionalized ethylene-based polymer to ethylene-based polymer is from 1/20 to 1/4, or from 1/20 to 1/6, or from 1/20 to 1/8, or from 1/20 to 1/10.

In one embodiment, the composition comprises ≥90 wt %, or ≥92 wt %, or ≥95 wt %, or ≥98 wt %, or ≥99 wt % of the sum weight of the ethylene-based polymer and the functionalized ethylene-based polymer, based on the weight of the composition.

In one embodiment, the composition further comprises a second ethylene-based polymer.

In one embodiment, the functionalized ethylene-based polymer is an anhydride functionalized ethylene-based polymer, and further an anhydride grafted ethylene-based polymer. In one embodiment, the functionalized ethylene-based polymer is a maleic anhydride functionalized ethylene-based polymer, and further a maleic anhydride grafted ethylene-based polymer.

In one embodiment, the composition comprises a functionalization content of ≥0.05 wt %, or ≥0.08 wt %, or ≥0.10 wt %, or ≥0.11 wt %, or ≥0.12 wt % based on the total weight of the polymer composition. In one embodiment, the composition comprises a functionalization content of ≤2.00 wt %, or ≤1.50 wt %, or ≤1.00 wt %, or ≤0.50 wt %, based on the total weight of the polymer composition.

In one embodiment, the polymer composition is in a pellet form (for example, a single pellet).

Also is provided a composition formed by the process of any one or more embodiments described herein, and preferably in pellet form (for example, single pellet form).

In one embodiment, the composition has a melt index (I$_2$) ≥0.25 dg/min, or ≥0.50 dg/min, or ≥1.0 dg/min, or ≥1.5 dg/min, or ≥2.0 dg/min, or ≥5.0 dg/min, or ≥10 dg/min. In one embodiment, the composition has a melt index (I$_2$)≤200 dg/min, or ≤150 dg/min, or ≤100 dg/min, or ≤50 dg/min.

In one embodiment, the composition has a density ≥0.880 g/cc, or ≥0.890 g/cc, or ≥0.900 g/cc. In one embodiment, the composition has a density ≤0.940 g/cc, or ≤0.935 g/cc, or ≤0.930 g/cc.

In one embodiment, the polymer composition has a gel content (GI200) of ≤20, or ≤18, or ≤16, or ≤14, or ≤12, or ≤10, or ≤8.0, or ≤7.0, or ≤6.0, or ≤5.0 mm$^2$ per 24.6 cm$^3$ of film.

In one embodiment, the functionalized ethylene-based polymer is present in an amount from 2 wt % to 50 wt %, or from 2 to 45 wt %, or from 2 wt % to 40 wt %, or from 2 wt % to 35 wt %, or from 2 wt % to 30 wt %, based on the weight of the polymer composition.

In one embodiment, the functionalized ethylene-based polymer is present in an amount from 2 wt % to 25 wt %, or from 2 to 20 wt %, or from 2 wt % to 15 wt %, or from 2 wt % to 10 wt %, or from 2 wt % to 5 wt %, based on the weight of the polymer composition.

In one embodiment, the functionalized ethylene-based polymer is present in an amount from 2 wt % to 50 wt %, or from 2 to 45 wt %, or from 2 wt % to 40 wt %, or from 2 wt % to 35 wt %, or from 2 wt % to 30 wt %, based on the weight of the ethylene-based polymer and the functionalized ethylene-based polymer.

In one embodiment, the functionalized ethylene-based polymer is present in an amount from 2 wt % to 25 wt %, or from 2 to 20 wt %, or from 2 wt % to 15 wt %, or from 2 wt % to 10 wt %, or from 2 wt % to 5 wt %, based on the weight of the ethylene-based polymer and the functionalized ethylene-based polymer.

In one embodiment, the weight ratio of functionalized ethylene-based polymer to ethylene-based polymer is from 1/20 to 1/3, or from 1/20 to 1/5, or from 1/20 to 1/7, or from 1/20 to 1/9.

In one embodiment, the weight ratio of functionalized ethylene-based polymer to ethylene-based polymer is from 1/20 to 1/4, or from 1/20 to 1/6, or from 1/20 to 1/8, or from 1/20 to 1/10.

In one embodiment, the composition comprises ≥90 wt %, or ≥92 wt %, or ≥95 wt %, or ≥98 wt %, or ≥99 wt % of the sum weight of the ethylene-based polymer and the functionalized ethylene-based polymer, based on the weight of the composition.

In one embodiment, the composition further comprises a second ethylene-based polymer.

In one embodiment, the functionalized ethylene-based polymer is an anhydride functionalized ethylene-based polymer, and further an anhydride grafted ethylene-based polymer. In one embodiment, the functionalized ethylene-based polymer is a maleic anhydride functionalized ethylene-based polymer, and further a maleic anhydride grafted ethylene-based polymer.

In one embodiment, the composition comprises a functionalization content of ≥0.05 wt %, or ≥0.08 wt %, or ≥0.09 wt %, or ≥0.10 wt %, or ≥0.11 wt %, or ≥0.12 wt % based on the total weight of the polymer composition. In one embodiment, the composition comprises a functionalization content of ≤2.00 wt %, or ≤1.50 wt %, or ≤1.00 wt %, or ≤0.50 wt %, based on the total weight of the polymer composition.

In one embodiment, the composition further comprises one or more additives.

Also is provided an article that comprises at least one component formed from the composition of one or more embodiments described herein.

In one embodiment, the article is selected from a film structure comprising one or more layers, an adhesive primer composition, a dispersion, an automotive part, or a building or construction part. In one embodiment, the article is selected from a film structure comprising one or more layers.

In one embodiment, the article is selected from a film comprising ≥1 layer, or ≥2 layers, or ≥3 layers, or ≥4 layers, or ≥5 layers.

In one embodiment, the film comprises ≥3 layers. In a further embodiment, at least two layers are formed from the same polymer composition, as described herein. In a further embodiment, these two layers are separated by a layer formed from a composition comprising a polar polymer, such as nylon, EVOH, or a combination thereof. In one embodiment, the film has an average load peel adhesion ≥10.0, or ≥11.0, or ≥12.0, or ≥12.5, or ≥13.0 N/2.54 cm. In one embodiment, the film has peak load peel adhesion ≥14.0, or ≥14.5, or ≥15.0, or ≥15.5 N/2.54 cm.

Ethylene-Based Polymer

In one embodiment, the ethylene-based polymer is an ethylene homopolymer or ethylene-based interpolymer. In a further embodiment, the ethylene-based polymer is an ethylene homopolymer or an ethylene-based copolymer.

In on embodiment, the ethylene-based polymer is an ethylene-based interpolymer. In one embodiment, the ethylene-based interpolymer comprises greater than, or equal to, 60 wt %, further greater than, or equal to, 70 wt %, further greater than, or equal to, 80 wt %, further greater than, or equal to, 85 wt %, polymerized ethylene, based on the weight of the interpolymer. In a further embodiment, the ethylene-based interpolymer is an ethylene-based copolymer. In one embodiment, the ethylene-based interpolymer is an ethylene/alpha-olefin interpolymer, and further an ethylene/alpha-olefin copolymer. Suitable α-olefins include, but are not limited to, $C_3$-$C_{20}$ α-olefins, and preferably $C_3$-$C_{10}$ α-olefins. More preferred α-olefins include propylene, 1-butene, 1-pentene, 1-hexene, 1-heptene and 1-octene, further include propylene, 1-butene, 1-hexene and 1-octene, and further 1-butene, 1-hexene and 1-octene.

In one embodiment, the ethylene-based polymer has a density ≥0.880 g/cc, or ≥0.890 g/cc, or ≥0.900 g/cc, or ≥0.910 g/cc (1 cc=1 cm$^3$). In one embodiment, the ethylene-based polymer has a density ≤0.950 g/cc, or ≤0.945 g/cc, or ≤0.940 g/cc, or ≤0.935 g/cc, or ≤0.930 g/cc, or ≤0.925 g/cc, or ≤, 0.920 g/cc. In one embodiment, the ethylene-based polymer is an ethylene/alpha-olefin interpolymer, and further an ethylene/alpha-olefin copolymer. Suitable α-olefins are described above.

In one embodiment, the ethylene-based polymer has a density from 0.880 g/cc to 0.950 g/cc, further from 0.890 g/cc to 0.940 g/cc, and further from 0.900 g/cc to 0.930 g/cc. In one embodiment, the ethylene-based polymer is an ethylene/alpha-olefin interpolymer, and further an ethylene/alpha-olefin copolymer. Suitable α-olefins are described above.

In one embodiment, the ethylene-based polymer has a density from 0.900 g/cc to 0.935 g/cc, further from 0.905 g/cc to 0.930 g/cc, and further from 0.910 g/cc to 0.925 g/cc. In one embodiment, the ethylene-based polymer is an ethylene/alpha-olefin interpolymer, and further an ethylene/alpha-olefin copolymer. Suitable α-olefins are described above.

In one embodiment, the ethylene-based polymer has a melt index ($I_2$, 2.16 kg, 190° C.) ≥0.25 dg/min, ≥0.5 dg/min, or ≥0.6 dg/min, or ≥0.7 dg/min, or ≥0.8 dg/min, or ≥0.9 dg/min, or ≥1.0 dg/min, or greater than or equal to 1.2 dg/min. In one embodiment, the ethylene-based polymer has a melt index ($I_2$, 2.16 kg, 190° C.)≤100 dg/min, or ≤50 dg/min, or ≤20 dg/min, or ≤10 dg/min, or ≤5.0 dg/min. In one embodiment, the ethylene-based polymer is an ethylene/alpha-olefin interpolymer, and further an ethylene/alpha-olefin copolymer. Suitable α-olefins are described above.

In one embodiment, the ethylene-based polymer is free from any oxo-boron compounds. In one embodiment, the ethylene-based polymer composition is free from any borane-containing compounds.

The ethylene-based polymer may comprise a combination of two or more embodiments as described herein.

Functionalized Ethylene-Based Polymer

In one embodiment, the functionalized ethylene-based polymer is a functionalized ethylene-based homopolymer or a functionalized ethylene-based interpolymer, and further a functionalized ethylene-based copolymer, with the ethylene-based copolymer as described above.

In one embodiment, the functionalized ethylene-based polymer is an anhydride, carboxylic acid and/or silane functionalized ethylene-based polymer, or further an anhydride functionalized ethylene-based polymer, or further a maleic anhydride functionalized ethylene-based polymer.

In one embodiment, the functionalized ethylene-based polymer is an anhydride, carboxylic acid and/or silane functionalized ethylene-based homopolymer or anhydride, carboxylic acid and/or silane functionalized ethylene-based interpolymer.

In one embodiment, the functionalized ethylene-based polymer is an anhydride, carboxylic acid and/or silane functionalized ethylene-based interpolymer, or further an anhydride, carboxylic acid and/or silane functionalized ethylene-based copolymer, or further an anhydride, carboxylic acid and/or silane functionalized ethylene/α-olefin copolymer.

In one embodiment, the functionalized ethylene-based polymer is an anhydride and/or carboxylic acid functionalized ethylene-based homopolymer, or anhydride and/or carboxylic acid functionalized ethylene-based interpolymer, and further an anhydride and/or carboxylic acid functionalized ethylene-based copolymer.

In one embodiment, the functionalized ethylene-based polymer is an anhydride functionalized ethylene-based homopolymer or anhydride functionalized ethylene-based interpolymer, and further an anhydride functionalized ethylene-based copolymer.

In one embodiment, the functionalized ethylene-based polymer is a maleic anhydride functionalized ethylene-based homopolymer or a maleic anhydride functionalized ethylene-based interpolymer, and further a maleic anhydride functionalized ethylene-based copolymer.

In one embodiment, the functionalized ethylene-based polymer is a grafted ethylene-based polymer. In one embodiment, the functionalized ethylene-based polymer is a grafted ethylene homopolymer or grafted ethylene-based interpolymer. In an embodiment, the grafted ethylene-based interpolymer is a grafted ethylene-based copolymer.

In one embodiment, the functionalized ethylene-based polymer is an anhydride, carboxylic acid and/or silane grafted ethylene-based homopolymer, or anhydride, carboxylic acid and/or silane grafted ethylene-based interpolymer, or further an anhydride, carboxylic acid and/or silane grafted ethylene-based copolymer.

In one embodiment, the functionalized ethylene-based polymer is an anhydride and/or carboxylic acid grafted ethylene-based homopolymer, or an anhydride and/or carboxylic acid grafted ethylene-based interpolymer, or further an anhydride and/or carboxylic acid grafted ethylene-based copolymer.

In one embodiment, the functionalized ethylene-based polymer is an anhydride, carboxylic acid and/or silane grafted ethylene/α-olefin interpolymer, or further an anhydride, carboxylic acid and/or silane grafted ethylene/α-olefin copolymer. Suitable α-olefins include $C_3$-$C_{20}$ α-olefins, and preferably $C_3$-$C_{10}$ α-olefins.

In one embodiment, the functionalized ethylene-based polymer is an anhydride and/or carboxylic acid grafted ethylene-based homopolymer, or an anhydride and/or carboxylic acid grafted ethylene/α-olefin interpolymer, or further an anhydride and/or acid grafted ethylene-/α-olefin copolymer. Suitable α-olefins include $C_3$-$C_{20}$ α-olefins, and preferably $C_3$-$C_{10}$ α-olefins.

In one embodiment, the functionalized ethylene-based polymer is an anhydride grafted ethylene/α-olefin interpolymer, or further an anhydride grafted ethylene/α-olefin copolymer. Suitable α-olefins include $C_3$-$C_{20}$ α-olefins, and preferably $C_3$-$C_{10}$ α-olefins.

In one embodiment, the functionalized ethylene-based polymer is a maleic anhydride grafted ethylene-based homopolymer or a maleic anhydride grafted ethylene-based interpolymer.

In one embodiment, the functionalized ethylene-based polymer is a maleic anhydride grafted ethylene/α-olefin interpolymer, or further a maleic anhydride grafted ethylene/α-olefin copolymer. Suitable α-olefins include $C_3$-$C_{20}$ α-olefins, and preferably $C_3$-$C_{10}$ α-olefins.

In one embodiment, the functionalized ethylene-based polymer comprises ≥0.6 weight percent (wt %), or ≥0.8 wt %, or ≥1.0 wt %, or ≥1.1 wt %, or ≥1.2 wt %, of the functionalization agent (functionalization content), based on the weight of the functionalized ethylene-based polymer. In a further embodiment, the functionalization agent is an anhydride, carboxylic acid and/or silane, further an anhydride, and further maleic anhydride.

In one embodiment, the functionalized ethylene-based polymer comprises ≥1.4 wt %, or ≥1.6 wt %, or ≥1.8 wt %, or ≥2.0 wt % of the functionalization agent (functionalization content) based on the weight of the functionalized ethylene-based polymer composition. In a further embodiment, the functionalization agent is an anhydride and/or carboxylic acid, further anhydride, and further maleic anhydride.

In one embodiment, the functionalized ethylene-based polymer is a maleic anhydride grafted ethylene-based interpolymer, or further a maleic anhydride grafted ethylene-based copolymer, or further a maleic anhydride grafted ethylene/α-olefin copolymer and contains greater than 0.01 wt % of anti-oxidants, or greater than 0.02 wt % anti-oxidants, or greater than 0.03 wt % anti-oxidants, based on the weight of the functionalized ethylene-based polymer, and less than 2.0 wt %, or less than 1.0 wt %, or less than 0.5 wt % anti-oxidants, based on the weight of the functionalized ethylene-based polymer.

In one embodiment, the functionalized ethylene-based polymer is free from any oxo-boron compounds. In one embodiment, the functionalized ethylene-based polymer is free from any borane-containing compounds.

A functionalized ethylene-based polymer may comprise a combination of two or more embodiments as described herein.

Polymer Composition

In one embodiment, the polymer composition comprises greater than or equal to 90 wt %, or greater than or equal to 92 wt %, or greater than or equal to 95 wt %, or greater than or equal to 98 wt %, or greater than or equal to 99 wt % of the sum weight of the ethylene-based polymer and the functionalized ethylene-based polymer, based on the weight of the composition.

In one embodiment, the weight ratio of functionalized ethylene-based polymer to ethylene-based polymer is from 1/20 to 1/4, or from 1/20 to 1/9.

In one embodiment, the polymer composition comprises two functionalized ethylene-based polymers. In an embodiment, the polymer composition comprises greater than or equal to 90 wt %, or greater than or equal to 92 wt %, or greater than or equal to 95 wt %, or greater than or equal to 98 wt %, or greater than or equal to 99 wt % the sum weight of the ethylene-based polymer and the two functionalized ethylene-based polymers, based on the weight of the polymer composition.

In one embodiment, the composition comprises two ethylene-based polymers. In one embodiment, the composition comprises greater than or equal to 90 wt %, or greater than or equal to 92 wt %, or greater than or equal to 95 wt %, or greater than or equal to 98 wt %, or greater than or equal to 99 wt % the sum weight of the two ethylene-based polymers and the functionalized ethylene-based polymer, based on the weight of the polymer composition.

In one embodiment, the polymer composition comprises two functionalized ethylene-based polymers and two ethylene-based polymers. In an embodiment, the polymer composition comprises greater than or equal to 95 wt %, or greater than or equal to 98 wt %, or greater than or equal to 99 wt % the sum weight of the two functionalized ethylene-based polymers and the two ethylene-based polymers, based on the weight of the polymer composition.

In one embodiment, the polymer composition has a yellowness index (YI) value ≤45, or ≤40, or ≤38, or ≤37, or ≤35.

In an embodiment, the polymer composition has a gel content, GI200≤20, or ≤18, or ≤15, or ≤12, or ≤10, or ≤8.0, or ≤ to 7.0, or ≤ to 6.0, or ≤5.0.

In one embodiment, the polymer composition has a melt index ($I_2$, 2.16 kg, 190° C.) of greater than or equal to 0.5 dg/min, or greater than or equal to 1.5 dg/min, or greater than or equal to 2 dg/min, or greater than or equal to 2.5 dg/min, or greater than or equal to 2.6 dg/min, or greater than or equal to 2.7 dg/min, or greater than or equal to 2.8 dg/min. In one embodiment, the polymer composition has a melt index ($I_2$, 2.16 kg, 190° C.) of less than or equal to 50 dg/min, or less than or equal to 40 dg/min, or less than or equal to 30 dg/min, or less than or equal to 20 dg/min, or less than or equal to 15 dg/min, or less than or equal to 10 dg/min, or less than or equal to 6.0 dg/min.

In one embodiment, the polymer composition comprises greater than, or equal to, 0.02 weight percent (wt %), or greater than, or equal to 0.04 wt %, or greater than or equal to 0.06 wt %, or greater than, or equal to, 0.08 wt %, or greater than, or equal to, 0.10 wt %, or greater than, or equal to, 0.12 wt % of the functionalization agent (functionalization content), based on the weight of the polymer composition. In one embodiment, the functionalization agent is an anhydride, carboxylic acid and/or silane, or an anhydride, and or maleic anhydride.

In one embodiment, the polymer composition comprises less than, or equal to, 5.0 weight percent (wt %), or less than, or equal to 4.0 wt %, or less than or equal to 3.0 wt %, or less than, or equal to, 2.0 wt %, of the functionalization agent (functionalization content), based on the weight of the polymer composition. In one embodiment, the functionalization agent is an anhydride, carboxylic acid and/or silane, or an anhydride, and or maleic anhydride.

In one embodiment, the polymer composition is free from any oxo-boron compounds. In one embodiment, the polymer composition is free from any borane-containing compounds.

In one embodiment, the polymer composition is an adhesive or a tie layer composition. In one embodiment, the polymer composition a tie layer composition.

The polymer composition may comprise a combination of two or more embodiments as described herein.

Additives and Applications

Also provided is a final composition comprising a polymer composition as described herein. The final composition may comprise one or more additives. Additives include, but are not limited to, anti-oxidants, fire retardants, UV stabilizers, plasticizers, colorants, fillers (e.g., inorganic fillers), and slip agents. In one embodiment, the functionalized ethylene-based polymer composition comprises ≤10.0 wt %, or ≤5.0 wt %, or ≤2.0 wt %, or ≤1.0 wt %, or ≤0.5 wt % of the combined weight of one or more additives, based on the weight of the final composition. In one embodiment, the final composition comprises at least one flame retardant and/or at least one filler (e.g., inorganic filler).

The final composition may further comprise one other polymer, in addition to the ethylene-based polymer and the functionalized ethylene-based polymer and. Suitable polymers for blending include natural and synthetic polymers. Suitable polymers include propylene-based polymers (both impact modifying polypropylene, isotactic polypropylene, atactic polypropylene, and random propylene/ethylene copolymers), polystyrene, impact modified polystyrene, ABS, styrene/butadiene block copolymers, and hydrogenated derivatives thereof (SBS and SEBS), and thermoplastic polyurethanes.

Definitions

Unless stated to the contrary, all test methods are current as of the filing date of this disclosure.

The term "composition," as used herein, includes a material or mixture of materials which comprise the composition, as well as reaction products and decomposition products formed from the materials of the composition. Typically, any reaction products and/or decomposition products are present in trace amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities, for example, catalyst residues, may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term "olefin-based polymer," as used herein, refers to a polymer that typically comprises, in polymerized form, at least a majority amount of an olefin monomer, for example, ethylene or propylene, based on the weight of the polymer, and optionally may comprise one or more comonomers. If the olefin-based polymer is an ethylene-based polymer, see the definition below. In one embodiment, the olefin-based polymer comprises a majority amount of the olefin monomer (based on the weight of the polymer) and optionally may comprise one or more comonomers.

The term "propylene-based polymer," as used herein, refers to a polymer that comprises, in polymerized form, a majority amount of propylene monomer based on the weight of the polymer and, optionally may comprise one or more comonomers.

The term, "ethylene-based polymer," as used herein, refers to a polymer that comprises, in polymerized form, at least 50 wt % or a majority amount of ethylene monomer (based on the weight of the polymer), and optionally may comprise one or more comonomers. In one embodiment, the ethylene-based polymer comprises a majority amount of ethylene monomer (based on the weight of the ethylene-based polymer), and optionally may comprise one or more comonomers.

The term, "ethylene-based interpolymer," as used herein, refers to an interpolymer that comprises, in polymerized form, at least 50 wt % or a majority amount of ethylene monomer (based on the weight of the interpolymer), and at least one comonomer. In one embodiment, the ethylene-based interpolymer comprise a majority amount of ethylene (based on the total weight of the ethylene-based interpolymer) and at least one comonomer.

The term, "ethylene-based copolymer," as used herein, refers to a copolymer that comprises, in polymerized form, at least 50 wt % or a majority amount of ethylene monomer (based on the weight of the copolymer), and a comonomer, as the only two monomer types. In one embodiment, the ethylene-based copolymer comprises a majority amount of ethylene monomer (based on the weight of the ethylene-based copolymer) and a comonomer as the only two monomer types.

The term, "ethylene/α-olefin interpolymer," as used herein, refers to an interpolymer that comprises, in polymerized form, at least 50 wt % or a majority amount of ethylene monomer (based on the weight of the interpolymer), and at least one α-olefin. In one embodiment, the ethylene/α-olefin interpolymer comprises a majority amount of ethylene monomer (based on the weight of the ethylene-based copolymer) and at least one α-olefin.

The term, "ethylene/α-olefin copolymer," as used herein, refers to a copolymer that comprises, in polymerized form, at least 50 wt % or a majority amount of ethylene monomer (based on the weight of the copolymer), and an α-olefin, as the only two monomer types. In one embodiment, the ethylene/α-olefin copolymer comprises a majority amount of ethylene monomer (based on the weight of the ethylene-based copolymer) and an α-olefin as the only monomer types.

The term "polymer composition," as used herein, refers to a composition comprising an ethylene-based polymer, and a functionalized ethylene-based polymer. Examples of ethylene-based polymers are described above. Examples of functionalized ethylene-based polymers are described above.

The term, "functionalized ethylene-based polymer," as used herein, refers to an ethylene-based polymer, as defined above, comprising bonded (for example, grafted) functional groups.

The term, "functionalized ethylene-based interpolymer," as used herein, refers to an ethylene-based interpolymer, as defined above, comprising bonded (for example, grafted) functional groups.

The term, "functionalized ethylene-based copolymer," as used herein, refers to an ethylene-based copolymer, as defined above, comprising bonded (for example, grafted) functional groups.

The term, "functionalized ethylene/α-olefin interpolymer," as used herein, refers to an ethylene/α-olefin interpolymer, as defined above, comprising bonded (for example, grafted) functional groups.

The term, "functionalized ethylene/α-olefin copolymer," as used herein, refers to an ethylene/α-olefin copolymer, as defined above, comprising bonded (for example, grafted) functional groups.

The term "anhydride, carboxylic acid, and/or silane functionalized ethylene-based polymer," and similar terms, as used herein, refer to an ethylene-based polymer comprising bonded anhydride groups, bonded carboxylic acid groups and/or bonded silane groups.

The term "anhydride and/or carboxylic acid functionalized ethylene-based polymer," and similar terms, as used herein, refer to an ethylene-based polymer comprising bonded anhydride groups and/or bonded carboxylic acid groups.

The term "anhydride functionalized ethylene-based polymer," and similar terms, as used herein, refer to an ethylene-based polymer comprising bonded anhydride groups. As understood in the art, trace amounts of anhydride groups may form carboxylic acid groups due to reaction with water, for example, in an atmosphere.

The term "functionalization agent," as used herein, refers to a compound containing at least one functional group which may be bonded into (for example, incorporated) and/or onto (for example, grafted) a polymer (i.e., an ethylene-based polymer).

The term "functional group," as used herein, refers to a chemical group comprising at least one heteroatom (e.g., O, N, Si, Cl). A functional group may additionally contain unsaturation. Exemplary functional groups include, but are not limited to, anhydrides, amines, acids, organic amides, esters and alcohols.

The term "functionalization content," as used herein, refers to the amount of bonded (for example, grafted) functionalization agent to the ethylene-based polymer of the ethylene-based polymer composition. This amount can be determined based, for example, on the weight of the polymer composition, or on the weight of the functionalized ethylene-based polymer.

The term "free-radical initiator," as used herein, refers to a compound that produces radical species for radical reactions.

The term "borane-containing compound," as used herein, refers to any molecule or compound containing a borane group.

The term "static mixer," as used herein, refers to a mixer with a motionless mixing design, and with at least one mixing element designed for the continuous mixing of fluid (e.g., gas or liquid (i.e., polymer melt)) materials.

The term "solvent" as used herein, refers to a non-reactive fluid in which one or more monomers dissolve. The polymerization reaction occurs in presence of a catalyst in the solvent, and results in a polymer which is also soluble in the solvent.

The term "side arm extruder", as used herein, refers to an extruder, for example, a single screw extruder, that is use to melt, and pump, the functionalized ethylene base polymer into another extruder, at a location after the gear pump of this other extruder, but before one or more static mixing elements.

The term "bulk of solvent," in reference to a polymer isolation step, as used herein, refers to the ≥50 wt % of the solvent, based on the weight of the solvent in the polymer solution formed after the solution polymerization process. In one embodiment ≥90 wt %, or ≥95 wt %, or ≥98 wt %, or ≥99 wt %, of the solvent in the polymer solution formed after the solution polymerization process, is removed. The bulk of solvent is removed after the devolatilization process, and typically <0.15 wt %, or <0.10 wt %, or <0.05 wt % residual solvent, based on the weight of the resulting polymer melt, remains in the polymer melt.

The term "polymer melt," as used herein if reference to the polymeric material exiting the at least one devolatilizer, refers to a composition comprising at least 90 wt % of at least one ethylene-based polymer, at a temperature at or above the melting temperature of the at least one ethylene-based polymer.

The term "devolatilization," as used herein, refers to the removal of volatile contaminants such as unreacted monomer, solvent, or water, from a polymer solution. Devolatilization is an important post-reactor unit operation in the processing of polymeric materials. In some embodiments, "devolatilization" may be referred to as polymer devolatilization for removal of the contaminants that are generally volatile relative to the polymeric material. Typically a devolatilization takes place in a devolatilizer.

The term "reactor configuration," as used herein, refers the apparatus used to polymerize a polymer, and which comprises one or more reactors, and optionally one or more reactor pre-heaters. Such reactors include, but are not limited to, loop reactor(s), stir tank reactor(s), and combinations thereof.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density

Density was measured in accordance with ASTM D-792.

Melt Index ($I_2$)

Melt index (2.16 kg, 190° C.) for the ethylene-based polymer and the functionalized ethylene-based polymer were each measured in accordance with ASTM D-1238.

Gel Content (GI200)

Gel content was measured using a single screw extruder—Model OCS ME 20 available from OCS Optical Control Systems GmbH Wullener Feld 36, 58454 Witten, Germany or equivalent. The specifications of this equipment were as follows:

| Parameter | Mixing Screw |
| --- | --- |
| L/D | 25/1 |
| Coating | Chrome |
| Compression Ratio | 3/1 |
| Feed Zone | 10D |
| Transition Zone | 3D |
| Metering Zone | 12D |
| Mixing Zone | 3D |

Cast Film Die: ribbon die, 150×0.5 mm, available from OCS Optical Control Systems GmbH, or equivalent.

Air Knife: OCS air knife to pin the film on the chill roll, available from OCS Optical Control Systems GmbH, or equivalent.

Cast Film Chill Rolls and Winding Unit: OCS Model CR-8, available from OCS Optical Control Systems GmbH, or equivalent.

TABLE 1

Conditions of Gel Measurement on OCS

| Throat Set Temperature | ° C. | 25 +/− 3 |
| --- | --- | --- |
| Zone 1 Set Temperature | ° C. | 179 +/− 5 |
| Zone 2 Set Temperature | ° C. | 191 +/− 5 |
| Zone 3 Set Temperature | ° C. | 204 +/− 5 |
| Clamp Ring Set Temperature | ° C. | 216 +/− 5 |
| Adapter Set Temperature | ° C. | 221 +/− 5 |
| Die Set Temperature | ° C. | 221 +/− 5 |
| Screw Type | | Mixing |
| Screw Speed | RPM | 70 +/− 2 |
| Chill Speed | m/min | 3 +/− 1 |
| Chill Temperature | ° C. | 20 +/− 2 |
| Tension Speed | m/min | 4 +/− 2 |
| Winder Torque | N | 4 +/− 1 |
| Lab Temperature | ° C. | 23 +/− 2 |
| Lab Humidity | % | <70 |
| Width | mm | 125 +/− 18 |
| Thickness | μm | 76/−5 |

Gel Counter: OCS FSA-100 line gel counter consisting of a lighting unit, a CCD detector and an image processor with the Gel counter software version 5.0.4.6, available form OCS Optical Control Systems GmbH, or equivalent. One analysis inspects 25 parcels, where a parcel is defined as 24.6 cm³ of film, or 0.324 m² for a film thickness of 76 μm.

Gel Count: The gel count is the number of gels detected by the gel camera; the counted gels are further classified based on the equivalent circular diameter of the area measured into the following categories: <100 micron, from ≥100 to 150 microns, from >150 to 200 microns, from >200 to 400 microns, from >400 to 800 microns, from >800 to 1600 microns, and >1600 microns. GI200 is defined as the sum of the areas of all gels with a diameter >200 μm, averaged over 25 parcels (GI200 units mm² per 24.6 cm³ of film). The diameter of a gel is determined as the diameter of a circle having an equivalent area. One analysis cycle inspects 24.6 cm³ of film. The corresponding area is 0.324 m² for a film thickness of 76 μm and 0.647 m² for a film thickness of 38 μm.

Level of Functionalization (wt %)

The level of functionalization (wt %) for maleic anhydride (MAH) is determined by the ratio of peak heights of the MAH (FTIR$_{MAH}$) and the peak heights of the maleic acid (FTIR$_{MA}$) to the peak heights of the polymer reference (FTIR$_{ref}$). The peak heights of MAH are at wave number 1791 cm$^{-1}$, the peak heights of MA are at 1721 cm$^{-1}$, and the peak heights of the polyethylene, which can be used as the polymer reference, are at 2019 cm$^{-1}$. The ratio of peak heights are multiplied by the appropriate calibration constants (A and B), and the products of the ratios and calibration constants are added together to equal the MAH wt %. When polyethylene is the reference polymer, the MAH wt % is calculated according to the following MAH wt % formula:

$$MAH\ wt\ \% = A\left(\frac{FTIR_{MAH}@1/91\ cm^{-1}}{FTIR_{ref}@2019\ cm^{-1}}\right) + B\left(\frac{FTIR_{MA}@1/21\ cm^{-1}}{FTIR_{ref}@2019\ cm^{-1}}\right).$$

The calibration "A" constant can be determined using C$^{13}$ NMR standards, which are known in the field. The actual calibration constant may differ slightly depending on the instrument and the polymers. The peak heights of maleic acid account for the presence of maleic acid in the polyolefins, which is negligible for freshly grafted polyolefins. However, over time, and in the presence of moisture, maleic anhydride is converted to maleic acid. For MAH grafted polyolefins having a high surface area, significant hydrolysis can occur under ambient conditions in just a few days. The calibration constant B is a correction for the difference in extinction coefficients between the anhydride and acid groups, which can be determined by standards known in the field. The MAH wt % formula takes different sample thicknesses into account to normalize the data.

A sample of the MAH grafted polyolefin can be prepared for FTIR analyst in a heating press. The sample of the adhesive layer, about 0.05 mm to about 0.15 mm in thickness, is placed between suitable protective films, such as MYLAR or TEFLON, to protect it from the platens of the heating press. Aluminum foil should not be used as a protective film because MAH reacts with aluminum. The sample is then placed in the heating press at about 150-180° C. and the platens should be under about 10 tons of pressure for about five minutes. The sample remains in the heating press for about one hour and then is allowed to cool to room temperature before being scanned in the FTIR.

A background scan should be run on the FTIR before each sample is scanned, or as needed. The sample is placed in an appropriate FTIR sample holder and then scanned in the FTIR. The FTIR will typically display an electronic graph providing the peak heights of MAH at wave number 1791 cm$_{-1}$, the peak heights of maleic acid at 1721 cm$^{-1}$, and the peak heights of polyethylene at 2019 cm$^{-1}$. The FTIR test should have an inherent variability less than +/−5%.

Adhesion Testing (Peel Strength)

One section of film (about 8 inches by about 11 inches) was place in contact (machine direction in parallel with machine direction) with a second section of film (about 8 inches by about 11 inches), such that the following configuration resulted: layer A (DOWLEX 2046G)/layer B (tie layer)/layer C (nylon)/layer D (tie layer)/layer E (DOWLEX 2045G)//layer E (DOWLEX 2045G)/layer D (tie layer)/layer C (nylon)/layer B (tie layer)/layer A (DOWLEX 2045G). Each 5-layer film thickness=100 microns. A portion of this pre-test configuration was sealed with a seal bar having a surface area of "5 mm×8 inches." The seal bar was placed two inches from the end of the pre-test configuration, such that the length of the seal bar ran the entire width of the pre-test configuration, and the length of the seal bar ran parallel to the cross-direction of each film layer of the pre-test configuration. To form the seal, the seal bar, as applied to the pre-test configuration, was equilibrated at a temperature of 130 C, and a pressure of 40 psi was applied for a 0.5 second period. This resulted in a bond area of "5 mm×8 inches" across the 8 inch width of the pre-test configuration, and located 2 inches from the pre-test configuration, to result in a bonded pre-test configuration.

Pre-test strips where cut from the bonded pre-test configuration using a manual punch press die, and having the following dimensions: 1 inch (cross direction)×6 inches (machine direction). The bond area (0.5 mm×1 inch) was located one inch from the end of the pre-test strip, such that the pre-test strip has an unbonded area at one end, of one inch in length, and an unbonded area at the other end of the pre-test strip, of 5 inches in length.

The free "1 inch" ends of a pre-test strip are inserted into the respective jaws of an INSTRON, and ends are pulled at a rate of one inch per minutes (temp. 23° C.±2° C.; RH (relative humidity) of 50%±10%). This initial pull was done to force a partial separation at one tie layer—nylon interface (weakest interface) in one "5-layer" film. After the partial separation (typically 0.2 cm to 0.5 cm in length) occurred, the pre-test strip was removed from the jaws of the INSTRON, and the "in-tack" 5-layer film section was removed from the test strip using scissors, to form a test strip (5-layer film, delaminated at the tie/nylon interface) for further analysis.

The free ends of the test strip are then inserted into the respective jaws of the INSTON, and ends are pulled at a rate of 12 inches per minutes, to a distance of 5 inches of crosshead travel of the INSTON (temp. 23° C.±2° C.; RH (relative humidity) of 50%±10%), to further separate the film at the tie layer/nylon interface. The maximum (peak) force (peak load) used to separate the noted layers was recorded by the INSTRON. The average load, determine by taking the average force of a defined segment (force measured from 1 inch to 4 inches of crosshead travel), was also recorded by the INSTON. Five test strips were analyzed per film, and the average of these five samples were reported in Table 6 below.

Experimental

Materials

The materials used in this study are shown in Table 2.

TABLE 2

| Materials | | | | |
|---|---|---|---|---|
| Designation | Type | Supplier | Density, g/cc | Melt Index I2, dg/min |
| DOWLEX 2047G | LLDPE* | Dow Chemical | 0.919 | 2.3 |
| DOWLEX 2045G | LLDPE | Dow Chemical | 0.922 | 1.0 |

TABLE 2-continued

| Materials | | | | |
|---|---|---|---|---|
| Designation | Type | Supplier | Density, g/cc | Melt Index I2, dg/min |
| ELITE 5400G | LLDPE** | Dow Chemical | 0.916 | 1.0 |
| ELITE 5230G | LLDPE** | Dow Chemical | 0.916 | 4.0 |
| ULTRAMID C33 | Nylon 6 | BASF | — | — |
| Graft 1 | MAH-g-LLDPE$^A$ | Dow Chemical | 0.912 | 3.0 |
| Graft 2 | MAH-g-LLDPE$^B$ | Dow Chemical | 0.912 | 1.8-2.3 |

*LLDPE—Linear Low Density Polyethylene.
**In reactor blend
$^A$AMPLIFY TY 1057H, MAH Graft Level 1.0-1.5 wt %, based on the weight of the functionalized polymer.
$^B$MAH Graft Level 2.3-2.5 wt %, based on the weight of the functionalized polymer (see "MAH-grafted IE 1" from US 62/272390, filed Dec. 29, 2015).

Side-Arming Experiments Set-Up

The set-up described herein represents a lab simulation of an inventive process. The set-up consisted of a twin screw extruder that was used to melt the ethylene-based polymer (LLDPE; this LLDPE is prepared in a solution polymerization and isolated (each not shown)). This LLDPE melt was fed to a gear pump, and pumped through a static mixer set-up, where the functionalized ethylene-based polymer (MAH-grafted LLDPE) was side-armed through a melt injector, using a single screw extruder and prior to the static mixing elements. After mixing, the resultant adhesive blend was passed through a divert valve and pelletized using an underwater pelletizer. The equipment specifications and operating conditions were as follows:

A "40 mm CENTURY co-rotating" twin screw extruder with a 150 HP motor/1200 rpm max screw speed was used. A "36 L/D" set-up, with a mild melting screw, was used in the twin screw extruder. The functionalized ethylene-based polymer was fed using a loss-in-weight K-TRON T-35 feeder. The temperature was 100° C. in Zone 2, 220° C. in Zones 3-9 and 220° C. in the adaptor. The screw speed was set at 175 rpm, and all experiments were run at 100 lbs/hr (45.4 kg/hr).

The "polymer melt pump" was a MAAG 100 cc/revolution pump (Model S-60) powered by a 15 hp motor with a 20.55/1 reduction gear. The pump was equipped with a pressure transducer on the suction and discharge spool pieces, and a 5200 PSI rupture disc on the outlet transition piece. There were heater zones on the melt pump and on the inlet and outlet transition pieces. All zones were set at 220° C., and the melt pump operated at 112 rpm.

A STERLING 2½ (63.5 mm) Inch Single Screw Extruder was used as the side arm extruder, to melt the functionalized ethylene based polymer and pumped this melt just prior to the static mixers using a injector. The single screw extruder was operated in a starved mode, and fed with a K-TRON T-20 feeder. The temperature of all four zones were set at 200° C., and the screw speed was set to 30 rpm. The feed rate was varied based on the formulation desired.

The static mixing section consisted of a "25 inch (635 mm)" KENICS KME mixer with nine helical elements, followed by a "17 inch (432 mm)" KENICS KME mixer with six helical elements, situated inside of a pipe and down-stream of the melt injector. The inside of the pipe was 3.1 inch (79 mm) in diameter, and the pipe had seven heating zones. All seven zones were set at 230° C.

After the static mixers, the resulting adhesive blend was pumped through a divert valve and pelletized using a Gala underwater pelletizer system (Model 6). The Gala was equipped with a 12 hole (2.36 mm hole diameter) Gala die and the cutter hub had 4 blades.

Purge Experiment

Experiments were also conducted to evaluate the ease of transitioning from side-arming the grafted polyethylene to a neat base resin with no grafted component. The purpose of this was to understand how long it would take to purge the functionalized component out of the static mixer. Long purge times (>30-60 minutes of side arming the ethylene-based polymer) would be undesirable. To evaluate this, polymer pellets were collected at t=0, 30 and 60 minutes, after running the side arm with ethylene-based polymer, and the gel level (GI 200) on these pellets was measured.

Table 5 shows results from the side-arming and transitioning experiments. The data point at t=0 min (no purge) was obtained after running the desired formulation (non-functional ethylene-based polymer and functionalized ethylene-based polymer) for >2 hours, and then collecting pellets for gel and adhesion testing. After collecting these pellets, non-functionalized polymer was fed to the side-arm, whereas the other primary feeder to the extruder continued to feed the non-functionalized polymer. Samples (pellets) were then collected at t=30 min and t=60 min. Results are shown in Table 3.

The results show that the static mixer does a good job at mixing the side-armed grafted polymer and the ungrafted polyethylene as seen by the low gel (GI200) numbers which are lower than 5 mm$^2$/24.6 cm$^3$ (see results for t=0). Further, the transitioning experiments surprisingly show that the gel level, in most cases, drops to acceptable levels after purging for 30 and 60 min. This is indicative of the grafted polymer not adhering to the metal surfaces of the static mixer and piping, and then breaking loose over a period of time, and appearing as gels in the gel test sample. A purge time of 60 min is considered acceptable from an operating standpoint.

Comparative Composition on Twin Screw

A comparative polymer composition (Comp. 1—twin screw) was prepared by using a twin screw extruder in which all ingredients (grafted, ungrafted LLDPE and anti-oxidants) in the formulation were fed through the main feed throat. The twin screw process conditions were same as those for the side-arming experiments. The only difference in this experiment was that the gear pump, static mixer and the side arm were removed, and the twin screw extruder was followed immediately by an adaptor to a divert valve and underwater pelletizer system. See results in Table 3 above.

Preparation of Multi-Layer Film

The multi-layer blown film samples were produced on a LABTECH, 5-Layer blown film line. The five layers are represented as A/B/C/D/E with the "A" layer being in the inside of the bubble. The individual feed lines vary by position on the bubble. Layers "A" and "E" (outside layers) were fed from a 25 mm single flight screw, which contains no mixing elements. Layers "B", "C", and "D" (three inner layers) are fed from a "20 mm" single flight screw, which contains no mixing elements. The 5 extruders combined fed to the 75 mm 5-layer flat die (30/11/18/11/30) of 23 kg/hr. The blow up ratio was 2.5. The barrel temperatures ranged from 166° C. to 232° C. The standard frost line height was 30 cm. The layer compositions are outlined in Table 4.

TABLE 4

| Blown Film Composition [[tie layer = PE + fn-PE blend.]] | | |
|---|---|---|
| Layer | Layer weight % | Run #1 (control) |
| A | 30 | DOWLEX 2045G |
| B | 10 | Tie layer |
| C | 20 | Nylon[1] |
| D | 10 | Tie layer |
| E | 30 | DOWLEX 2045G |
| Comments | Total film thickness = 100 microns (4.0 mil) | Established run parameters using commercial tie layer |

[1]ULTRAMID C33 - the nylon was dried before use.

Figure 1:
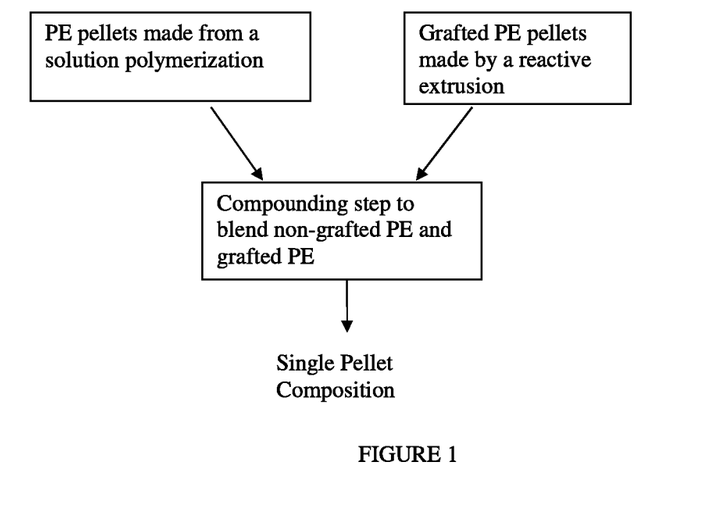
FIG. 1 depicts a schematic of an incumbent (comparative) process to make a single pellet composition (3 step process).

The formulations shown in Table 4 were made on the side-arm set-up (see, for example, FIG. 2), except for "Comp. 1" which was made using the twin screw (see, for example, FIG. 1). Each sample in Table 5 below was collected in normal operation (no purge, t=0 min).

TABLE 3

Gels from Side-Arming & Transitioning Experiments

| | Sample Description | Process | Polymer Comp. MAH* wt % | GI200**, t = 0 min | GI200, t = 30 min | GI200, t = 60 min |
|---|---|---|---|---|---|---|
| Ex. 1 | 10 wt % Graft 1/(90 wt % ELITE 5400G + ELITE 5230G (36.00:53.85 wt:wt)) | Side Arm | 0.12 | 3.1 | 3.6 | 1.4 |
| Ex. 2 | 10 wt % Graft 1/DOWLEX 2047G | Side Arm | 0.12 | 4.9 | 4.3 | 6.3 |
| Ex. 3 | 10 wt % Graft 1/ELITE 5400G | Side Arm | 0.12 | 3.6 | 2.1 | 2.5 |
| Ex. 4 | 5 wt % Graft 2/(95 wt % ELITE 5400G + ELITE 5230G (38.00:56.85 wt:wt)) | Side Arm | 0.12 | 3.6 | 3.1 | 1.4 |
| Ex. 5 | 10 wt % Graft 2/(90 wt % ELITE 5400G + ELITE 5230G (36.00:53.85 wt:wt)) | Side Arm | 0.23 | 3.5 | 1.4 | 1.3 |
| Comp. 1 | 10 wt % Graft 2/(90 wt % ELITE 5400G + ELITE 5230G (36.00:53.85 wt:wt)) | Twin Screw | 0.23 | 1.1-4.1 | — | — |

*Calculated value
**GI200 units: mm$^2$ per 24.6 cm$^3$, average of 25 parcels reported.

TABLE 5

Polymer Composition - Tie layer compositions

|  | Process | Graft 1[a] | Graft 2[b] | ELITE 5400G | ELITE 5230G (simulated insitu reactor blend) | DOWLE X2047G | AO[c] |
|---|---|---|---|---|---|---|---|
| Ex. 1 | Side Arm | 10.00 | — | 36.00 | 53.85 | — | 0.15 |
| Ex. 2 | Side Arm | 10.00 | — | — | — | 89.85 | 0.15 |
| Ex. 3 | Side Arm | 10.00 | — | 89.85 | — | — | 0.15 |
| Ex. 4 | Side Arm | — | 5.00 | 38.00 | 56.85 | — | 0.15 |
| Ex. 5 | Side Arm | — | 10.00 | 36.00 | 53.85 | — | 0.15 |
| Comp. 1 | Twin Screw | — | 10.00 | 36.00 | 53.85 | — | 0.15 |

[a]Graft 1 - 3.0 MI (190 C., 2.16 kg), 0.912 density, MAH graft level is 1.2% by weight.
[b]Graft 2 - 2.0 MI (190 C., 2.16 kg), 0.912 density, MAH graft level is 2.3% by weight.
[c]AO a 1:2 wt:wt blend of IRGANOX 1010 AND IRGAFOS 168.

Multi-Layer Film Adhesion

The adhesion results are shown in Table 6. The peak load and average load peel strength data shows that the low intensity mixing that the static mixer imparts is adequate to achieve acceptable adhesion. Surprisingly, this data compares well with the comparative sample made using a twin screw extruder which mixes with much higher intensity (higher energy input). In the adhesion testing, the average load is greater than 12.5 N/2.54 cm, and the peak load is greater than "15 N/2.54 cm" in all cases, and these results show each composition, prepared using the inventive process, functions well as a tie layer between the polyethylene and polyamide. In addition, a surprising finding is that in Experiment 4, even a lower loading of functionalized ethylene-based polymer (5 wt % of Graft 2) is sufficient to provide acceptable adhesion. This is highly desirable, as less functionalized polymer has to be side-armed into the process.

Surprisingly, the use of static mixers are adequate to impart the necessary mixing of the ethylene-based polymer and the functionalized ethylene-based polymer. The resultant single pellet composition provides acceptable adhesive with good adhesion properties, which are similar to compositions mixed in a relatively high shear mixing device, such as a twin screw extruder. The gel level of the resultant single pellet composition is also acceptable. Further, transitioning from the polymer composition, containing both the ethylene-based polymer and the functionalized ethylene-based polymer, to a composition containing only the ethylene-based polymer, was found to not be an issue. Purging for less than 60 minutes is sufficient to clean the static mixer. These improvements over the incumbent processes are advantageous, and help eliminate certain steps, such as excessive material handling, pelletizing, and re-melting the ethylene-based polymer, and result in a more efficient process. These improvements, such as the reduction in material

TABLE 6

Adhesion Results

|  | Sample Description | Process | Avg Load* (N/2.54 cm) | Peak Load* (N/2.54 cm) |
|---|---|---|---|---|
| Ex. 1 | 10 wt % Graft 1/(90 wt % ELITE 5400G + ELITE 5230G (36.00:53.85 wt:wt)) | Side Arm | 13.6 | 18.7 |
| Ex. 2 | 10% Graft 1/DOWLEX 2047G | Side Arm | 12.7 | 16.1 |
| Ex. 3 | 10% Graft 1/ELITE 5400G | Side Arm | 13.6 | 15.7 |
| Ex. 4 | 5% Graft 2/(95 wt % ELITE 5400G + ELITE 5230G (38.00:56.85 wt:wt)) | Side Arm | 13.5 | 15.5 |
| Ex. 5 | 10% Graft 2/(90 wt % ELITE 5400G + ELITE 5230G (36.00:53.85 wt:wt)) | Side Arm | 13.1 | 15.9 |
| Comp. 1 | 10% Graft 2/(90 wt % ELITE 5400G + ELITE 5230G (36.00:53.85 wt:wt)) | Twin screw | 13.2 | 17.5 |

*Delamination (separation) at tie layer and nylon interface. Average of five test strips reported.

As seen above in Table 3, the blends have maleic anhydride (MAH) levels from 0.12 wt % to 0.23 wt % maleic anhydride (MAH). Further, the grafted polyethylene has an advantage, in that a relatively a small amount (5%-15% by wt) of this polymer, in the single pellet composition, is required to achieve the desired properties. This enables the possibility to "side-arm" the grafted ethylene-based polymer, formed in a solution polymerization, which reduces the number of steps required to make the final adhesive composition, as compared to the number of steps required for incumbent technologies. Preferably, side-arming ≤25 wt % of the functionalized ethylene based polymer provides for the optimum use of design elements and for favorable economics.

handling requirements, pelletization, re-melting and storage, result in savings in energy and time, and eliminates the need for additional blending devices. Also, a single pellet adhesive resin is desired, because it provides for easier handling when transporting via railcars, and when storing in silos.

What is claimed is:
1. A process to form a polymer composition comprising an ethylene-based polymer and a functionalized ethylene-based polymer, said process comprising at least the following:
   a) polymerizing, in a solution polymerization, ethylene and optionally one or more comonomers, in a solvent, in a reactor configuration comprising at least one reactor, to form a polymer solution comprising the ethylene-based polymer;

b) passing the polymer solution through at least one devolatilizer to remove a bulk of the solvent, based on the weight of the solvent in the polymer solution, to form a polymer melt;

c) passing the polymer melt through at least one static mixer, and wherein the functionalized ethylene-based polymer, in melt form, is introduced into the polymer melt using a side-arm extruder, before the polymer melt enters the static mixer; and d) mixing the polymer melt and the functionalized ethylene-based polymer in the static mixer, to form the polymer composition, wherein a melt index (I2, 190° C.) of the functionalized ethylene-based polymer, in melt form, is from 0.3 to 25 dg/min;

wherein a gel content (G1200) of the functionalized ethylene-based polymer is ≤20.

2. The process of claim 1, wherein the functionalized ethylene-based polymer is present in an amount from 2 wt % to 25 wt % based on a weight of the polymer composition.

3. The process of claim 1, wherein the functionalized ethylene-based polymer is a maleic anhydride functionalized ethylene-based polymer.

4. The process of claim 1, wherein a weight ratio of the functionalized ethylene-based polymer to the ethylene-based polymer, in combined polymer melts, is from 1/20 to 1/4.

5. The process of claim 1, wherein a ratio of melt index (I2, 190° C.) of the functionalized ethylene-based polymer to melt index (I2, 190° C.) of the ethylene-based polymer, is from 0.20 to 5.00.

6. A polymer composition formed by the process of claim 1.

7. An article comprising at least one component formed from the composition of claim 6.

* * * * *

UNITED STATES PATENT AND TRADEMARK OFFICE
CERTIFICATE OF CORRECTION

PATENT NO. : 11,981,758 B2
APPLICATION NO. : 16/465927
DATED : May 14, 2024
INVENTOR(S) : Brian W. Walther, Santosh S. Bawiskar and Jianping Pan

Page 1 of 1

It is certified that error appears in the above-identified patent and that said Letters Patent is hereby corrected as shown below:

On the Title Page

Column 22 the "PCT Filed" date lists Nov. 11, 2017. The correct PCT filed date should be listed as Nov. 17, 2017.

Signed and Sealed this
Twenty-second Day of October, 2024

Katherine Kelly Vidal
*Director of the United States Patent and Trademark Office*